US 6,654,152 B2

(12) United States Patent
Jacobowitz et al.

(10) Patent No.: US 6,654,152 B2
(45) Date of Patent: Nov. 25, 2003

(54) FREQUENCY GUIDING FILTER FOR DISPERSION MANAGED SOLITON TRANSMISSION

(75) Inventors: Lawrence Jacobowitz, Wappingers Falls, NY (US); Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 09/962,871

(22) Filed: Sep. 25, 2001

(65) Prior Publication Data

US 2003/0058512 A1 Mar. 27, 2003

(51) Int. Cl.$^7$ .............................. G02F 1/01; G02F 1/03; H04J 14/02
(52) U.S. Cl. ........................ 359/240; 359/260; 398/80
(58) Field of Search ............................ 359/337.1, 240, 359/260; 398/80, 196

(56) References Cited

U.S. PATENT DOCUMENTS

| | | | | |
|---|---|---|---|---|
| 6,147,788 | A | * 11/2000 | Mamyshev et al. | 398/141 |
| 2002/0141012 | A1 | * 10/2002 | Leclerc et al. | 398/79 |
| 2002/0176457 | A1 | * 11/2002 | DeCusatis et al. | 372/26 |
| 2003/0044101 | A1 | * 3/2003 | Jacobowitz et al. | 385/10 |
| 2003/0056512 | A1 | * 3/2003 | Jacobowitz et al. | 398/74 |
| 2003/0072333 | A1 | * 4/2003 | Jacobowitz et al. | 372/20 |

OTHER PUBLICATIONS

Favre et al., "Robustness of a 20Gbit/s 63km Span 6Mm Sliding Filter Controlled Soliton Transmission", Electronics Letters, vol. 31, No. 18 (Aug. 1995).*

Mollenauer et al., Demonstration Using Sliding frequency Guiding Filters of Error–Free Soliton Transmission Over More Than 20Mm at 10Gbit/s 1–Channel, and More Than 1Mm at 20Gbit/s in a 2–Channel WDM, Electronics Letters, vol. 29, No. 10 (May 1995).*
Morton et al., "Packaged Hybrid Soliton Pluse Source Results and 270Tbit–km/s Soliton Transmission", IEEE Photonics Technology Letters, vol. 7, No. 1 (Jan. 1995).*
"Introduction to DWDM Technology Data in a Rainbow", by Stamatios V. Kartalopoulos, Lucent Technologies, Inc., IEEE communications Society, Sponsor, SPIE Optical Engineering Press, pp. 67–68.
"Introduction to DWDM Technology Data in a Rainbow", by Stamatios V. Kartalopoulos, Chapter 9, pp. 131–136.
"Distributed feedback semiconductor lasers", by John Carroll, et al., IEE Circuits, Devices and Systems Series 10, SPIE Press Monograph vol. PM52, 1998, pp. 7–15.
"Micromachining System Accommodates Large Wafers" Robert Bann et al., Laser Focus World, Jan. 2001, vol. 27, No. 1, pp. 189, 190 and 192.

* cited by examiner

Primary Examiner—David N. Spector
(74) Attorney, Agent, or Firm—Scully, Scoot, Murphy & Presser; Tiffany L. Townsend

(57) ABSTRACT

Wavelength locked feedback loops are provided in frequency guide filters, and particularly in sliding frequency guide filters, wherein the wavelength locked feedback loop allows precise control over the location of the filter center wavelength with respect to a transmitted soliton center wavelength, compensating for factors such as the filter rolloff, signal spectral width, and changes in the transmission line properties due to temperature, microbending, aging and other effects. This approach allows the construction of very inexpensive frequency guiding filters, which can be based on low precision frequency domain filters with active compensation. These advantages make it possible to design new types of dispersion managed soliton optical transmission networks.

21 Claims, 5 Drawing Sheets

FREQUENCY GUIDING FILTER FOR DISPERSION MANAGED SOLITON TRANSMISSION

BACKGROUND OF THE INVENTION

1. Field of the Invention

The present invention relates generally to frequency guiding filters for a dispersion managed soliton transmission system, and more particularly pertains to sliding frequency guiding filters using a wavelength locked feedback loop for a dispersion managed soliton transmission communication system.

The present invention uses wavelength locked feedback loops in frequency guide filters, and particularly in sliding frequency guide filters. The wavelength locked feedback loops offer various advantages over conventional methods. The main benefit is that the wavelength locked feedback loops allow precise control over the location of the filter peak center wavelength with respect to the transmitted signal peak center wavelength, to compensate for factors such as the filter rolloff, signal spectral width, and changes in transmission line properties due to temperature, microbending, aging and other effects. This approach allows the construction of very inexpensive frequency guiding filters, and also provides a new degree of freedom in the guide filter design (the guide filter can be designed with a dynamically controllable offset and sliding range). Taken together, these advantages make it possible to design new types of dispersion managed soliton transmission networks.

2. Discussion of the Prior Art

Long distance fiber optic communication systems have made increasing use of soliton transmissions to avoid dispersion and nonlinear effects that can limit both the distance and the bandwidth (maximum achievable data rate) thereof. FIG. 1a illustrates a fiber optic transmission system which typically consists of a laser source 1 and an optical receiver 2 connected by strands of glass fiber 3. The fiber attenuates optical signals from the transmitter; since the receiver has a limited sensitivity, signals can only be detected beyond a certain signal-to-noise ratio. The fiber also induces dispersion or pulse spreading which further degrades the receiver signal levels. Both attenuation and dispersion increase with distance and are more pronounced at higher data rates, which limits both the distance and data rate of a linear transmission system. One brute force approach to increasing the distance is to launch higher optical power levels into the fiber; beyond a certain point, this induces nonlinear effects which once again limit distance and bandwidth.

However, by inducing a controlled form of nonlinearity, it is possible to create optical pulses called solitons which do not change shape as they propagate. Solitons have become widely used in many long distance telecommunication systems, including dense wavelength division multiplexing (DWDM) systems, and in other data communication systems as well. However, various problems are associated with soliton transmission, in particular timing and frequency jitter.

Timing jitter can result from fluctuations in the frequency components of a soliton optical pulse; this imposes severe limitations on the signal to noise ratio. By controlling the frequency of the solitons, it is possible to control timing jitter as well. One approach to controlling the frequency of solitons is to periodically insert narrowband filters in a fiber optic link, usually at optical amplifier locations; these are known as frequency-guiding filters. If for some reason the center frequency of a soliton is shifted from the filter peak, the filter-induced differential loss across the pulse spectrum adjusts the pulse frequency. As a result, the pulse spectrum returns to the filter peak over some characteristic damping length L. If the damping length is considerably less than the transmission distance, then guiding filters can dramatically reduce the timing jitter. Although even linear fiber optic transmission systems will exhibit similar effects, guiding filters of this type can only be used in soliton based transmission systems. Every time an optical pulse passes through a guiding filter, its spectrum narrows; solitons can quickly recover their bandwidth through the fiber nonlinearity, whereas in a linear transmission system the filter acts to continuously degrade the signal.

Another variation is the sliding frequency gain filter in which the transmission peak of each guiding filter is shifted in frequency with respect to the transmission peak of the previous filter, so that the center frequency slides with distance at a predetermined rate. Because of their nonlinearity, solitons can follow the filters and slide in frequency, while linear noise is suppressed. By introducing sliding frequency guiding filters periodically positioned along the length of the transmission line, shown at 4-1, 4-2 in FIG. 1a, an optical transmission line using solitons becomes effectively an all-optical passive regenerator, compatible with DWDM networks. All nonsoliton components of the signal pulse are absorbed by the filters; while input pulses which are close to the optimal soliton profile are reshaped by the transmission line filters into propagating solitons. Note also that the filters act to remove energy fluctuations from the input optical signal, with a damping length close to the frequency damping length. This also acts to self-equalize the energy of different channels in a WDM transmission system. Feedback from the frequency guiding filters locks the energy of individual soliton channels to values that do not change with distance, even if optical amplifiers in the path have different gains at different wavelengths. Sliding frequency guide filters also reduce the timing and frequency drifts associated with effects such as soliton collisions and four wave mixing; they can also be used to construct hybrid transmission lines containing a mix of optical amps, positive dispersion fiber, negative dispersion fiber, and other optical elements which are designed to counterbalance each other and result in nearly flat average dispersion over long distances. Theoretical performance of 10 Gbit/s signals over 40,000 km or 20 Gbit/s signals over 14,000 km have been suggested using these techniques.

Conventional designs for sliding frequency filters have met with some success, but continue to face performance problems; in particular, etalon filters are not a good approximation of ideal parabolic filters, especially when large frequency excursions of solitons are involved; the curvature of the filter response reduces with the deviation of the frequency from the filter peak.

The following is additional background information about soliton transmission. Optical signals propagating in a glass fiber experience dispersion; an optical pulse of width t has a finite spectral bandwidth 1/t. When the pulse is transform limited, all of the spectral components have the same phase. In the time domain, all of the spectral components overlap in time. Because of dispersion, different spectral components propagate in the fiber with different group velocities; thus as the pulse propagates its frequency components spread out in time. The direction of this spreading, or chirp, depends on the sign of the group velocity dispersion (GVD), either positive or negative. There is also a nonlinear effect, self-phase modulation (SPM) resulting from the interaction between the light intensity and the nonlinear portion of the fiber's refractive index (also known as the Kerr effect). This produces a frequency shift determined by the time derivative of the pulse shape. In silica based fibers SPM always produces a positive chirp (shifts the leading edge of the pulse to the red spectral region). If both GVD and SPM are applied to an optical pulse with opposite signs, the two effects cancel each other out to yield a pulse which does not change shape as it propagates. The resulting pulse is known as a soliton, and is a nondispersive solution of the nonlinear Schrodinger equation. Pulses injected into a fiber which are close in shape to a soliton will be adjusted by the nonlinear effects to reform into stable soliton pulses.

One source of error in soliton systems is the fluctuation in pulse arrival times, or timing jitter. Spontaneous emission noise added to the optical signal modulates the carrier frequencies of the solitons at random. The chromatic dispersion of the fiber then converts the frequency variations into variations in pulse arrival times; this is known as the Gordon-Haus effect. Data errors occur when a pulse arrives outside its acceptable timing window. Thus this effect limits the maximum data bit rate and transmission distance. Another source of timing jitter is the acoustic interaction of pulses; electrostriction effects in the fiber result in each optical pulse generating an acoustic wave in the fiber. Other pulses experience a refractive index change caused by the acoustic wave. The resulting frequency changes of the pulse lead to timing jitter through the fiber's chromatic dispersion. Both of these error sources place severe limitations on the propagation distance and bit error rate which can be achieved. By controlling the frequency of the solitons, one can also control the timing jitter. This may be done by inserting narrowband filters periodically in the fiber path (so-called frequency guiding filters), usually at optical amplifier locations. If the center frequency of the soliton is shifted from the filter peak, the filter-induced differential loss across the pulse spectrum pushes the pulse frequencies back to the filter peak within some characteristic damping length, L. As long as L is less than the transmission distance, guiding filters significantly reduce the timing jitter.

The damping properties of guiding filters are determined mainly by the curvature of the filter response in the neighborhood of the filter peak. Thus shallow Fabry-Perot etalon filters can be used as guiding filters. These have multiple peaks, and each peak can be used for a different WDM channel, for example. The ability of guiding filters to control timing jitter is determined by the filter characteristics and the soliton spectral bandwidth.

The explanations herein discuss both wavelength and frequency, which have a reciprocal relationship ($\lambda=c/f$, where c=speed of light), as is well known in the field of optics.

Wavelength Division Multiplexing (WDM) and Dense Wavelength Division Multiplexing (DWDM) are light-wave application technologies that enable multiple wavelengths (colors of light) to be paralleled into the same optical fiber with each wavelength potentially assigned its own data diagnostics. Currently, WDM and DWDM products combine many different data links over a single pair of optical fibers by re-modulating the data onto a set of lasers, which are tuned to a very specific wavelength (within 0.8 nm tolerance, following industry standards). On current products, up to 32 wavelengths of light can be combined over a single fiber link with more wavelengths contemplated for future applications. The wavelengths are combined by passing light through a series of thin film interference filters, which consist of multi-layer coatings on a glass substrate, pigtailed with optical fibers. The filters combine multiple wavelengths into a single fiber path, and also separate them again at the far end of the multiplexed link. Filters may also be used at intermediate points to add or drop wavelength channels from the optical network.

Ideally, a WDM laser would produce a very narrow linewidth spectrum consisting of only a single wavelength, and an ideal filter would have a square bandpass characteristic of about 0.4 nm width, for example, in the frequency domain. In practice, however, every laser has a finite spectral width, which is a Gaussian spread about 1 to 3 nm wide, for example, and all real filters have a Gaussian bandpass function. It is therefore desirable to align the laser center wavelength with the center of the filter passband to facilitate the reduction of crosstalk between wavelengths, since the spacing between WDM wavelengths are so narrow. In commercial systems used today, however, it is very difficult to perform this alignment—lasers and filters are made by different companies, and it is both difficult and expensive to craft precision tuned optical components. As a result, the systems in use today are far from optimal; optical losses in a WDM filter can be as high as 4 db due to misalignment with the laser center wavelength (the laser's optical power is lost if it cannot pass through the filter). This has a serious impact on optical link budgets and supported distances, especially since many filters must be cascaded together in series (up to 8 filters in current designs, possibly more in the future). If every filter was operating at its worst case condition (worst loss), it would not be possible to build a practical system. Furthermore, the laser center wavelengths drift with voltage, temperature, and aging over their lifetime, and the filter characteristics may also change with temperature and age. The laser center wavelength and filter bandwidth may also be polarization dependent. This problem places a fundamental limit on the design of future WDM networking systems.

A second, related problem results from the fact that direct current modulation of data onto a semiconductor laser diode causes two effects, which may induce rapid shifts in the center wavelength of the laser immediately after the onset of the laser pulse. These are (1) frequency chirp and (2) relaxation oscillations. Both effects are more pronounced at higher laser output powers and drive voltages, or at higher modulation bit rates. Not only can these effects cause laser center wavelengths to change rapidly and unpredictably, they also cause a broadening of the laser linewidth, which can be a source of loss when interacting with optical filters or may cause optical crosstalk. Avoiding these two effects requires either non-standard, expensive lasers, external modulators (which are lossy and add cost), or driving the laser at less than its maximum power capacity (which reduces the link budget and distance). Lowering the data modulation rate may also help, but is often not an option in multi-gigabit laser links.

It would thus be highly desirable to provide a stable, optimal alignment between a laser center wavelength and the center of a Gaussian bandpass filter in order to optimize power transmission through such fiber optic systems and reduce optical crosstalk interference in optical networks.

SUMMARY OF THE INVENTION

Accordingly, it is a primary object of the present invention to provide a frequency guiding filters for dispersion managed soliton transmission communication systems using a wavelength locked feedback loop.

The present invention concerns wavelength selective devices which encompass wavelength selective devices of all types including filters of all types including comb filters, etalon filters and rotatable disc filters and wavelength selective gratings of all types including Bragg gratings and array waveguide gratings.

It is an object of the present invention to provide a servo-control "wavelength-locked loop" circuit that enables real time mutual alignment of an electromagnetic signal having a peaked spectrum function including a center wavelength and a wavelength selective device implementing a peaked passband function including a center wavelength, in a system employing electromagnetic waves.

It is another object of the present invention to provide a servo-control system and methodology for WDM and DWDM systems and applications that is designed to optimize power through multi-gigabit laser/optic systems.

It is a further object of the present invention to provide a wavelength-locked loop for an optical system that enables real time alignment and tracking of any spectral device that selects a wavelength, such as a Bragg grating, in optical fibers and waveguides, etc., for use in WDM systems.

It is yet another object of the present invention to provide a servo/feedback loop for an optical system, referred to as a "wavelength-locked loop," that enables real time alignment of a laser with variable optical attenuators by offsetting an optical filter from a known transmission in optical fibers and waveguides, etc.

It is yet a further object of the present invention to provide a servo/feedback loop for an optical system, referred to as a "wavelength-locked loop," that may be used in light polarization applications.

It is still another object of the present invention to provide a servo/feedback loop for an optical system, referred to as a "wavelength-locked loop," that enables real time alignment and tracking of laser center wavelengths and filter passband center wavelengths in multi-gigabit laser/optical systems such that the optical loss of a WDM filter/laser combination is greatly reduced, thereby enabling significantly larger link budgets and longer supported distances.

It is yet still another object of the present invention to provide a servo/feedback loop for an optical system, referred to as a "wavelength-locked loop," that enables real time alignment and tracking of laser center wavelengths and filter passband center wavelengths in multi-gigabit laser/optical systems such that lower cost lasers and filters may be used providing a significant cost reduction in the WDM equipment.

When employed in laser/optical networks, the system and method of the present invention may be used to tune for any type of wavelength-selective element in the network, including wavelength selective filters, attenuators, and switches, in fiber Bragg gratings, ring resonators in optical amplifiers, external modulators such as acousto-optic tunable filters, or array waveguide gratings. This applies to many other optical components in the network as well (for example, optical amplifiers that may act as filters when operating in the nonlinear regime). Furthermore, the system and method of the invention may be used to implement less expensive devices for all of the above application areas.

Alternately, the system and method of the invention may be implemented to tune such devices for WDM and optical network applications, in real-time, during manufacture. This would significantly increase lot yields of such devices which otherwise may be discarded as not meeting wavelength specifications as a result of manufacture process variations, for example.

The wavelength locked loop of the present invention enables a tighter control of wavelength, which allows an increased density of wavelength channels with less cross talk between channels in a wavelength multiplex system, which might typically include 32 or 64 channels or links. Pursuant to the present invention, each channel includes a separate wavelength locked loop which includes a separate source such as a laser and wavelength selective device such as a filter. Accordingly a wavelength multiplex system can include an array of 32 or 64 lasers and an array of 32 or 64 filters.

BRIEF DESCRIPTION OF THE DRAWINGS

The foregoing objects and advantages of the present invention for frequency guiding filters for dispersion managed soliton transmission system may be more readily understood by one skilled in the art with reference being had to the following detailed description of several embodiments thereof, taken in conjunction with the accompanying drawings wherein like elements are designated by identical reference numerals throughout the several views, and in which.

DETAILED DESCRIPTION OF THE DRAWINGS

The present invention provides a novel servo-control system implemented for optical systems including light sources, such as lasers, and frequency selective devices, such as bandpass filters. The servo-control system, herein referred to as the "wavelength-locked loop" or "lambda-locked loop" (since the symbol lambda is commonly used to denote wavelength), implements a dither modulation to continuously adjust the center wavelength of a frequency selective device, e.g. a filter passband, so as to track an electromagnetic signal source characterized as having a peaked frequency spectrum or peaked center wavelength, e.g. laser light in a soliton pulse. In this manner, optimal power of the signal is transmitted and optimal use is made of the system transmission bandwidth.

The present invention uses wavelength locked feedback loops in frequency guide filters, and particularly in sliding frequency guide filters. The wavelength locked feedback loops offer various advantages over conventional methods. The main benefit is that the wavelength locked feedback loops allow precise control over the location of the filter peak center wavelength with respect to the transmitted signal center wavelength of the optical signal; thus, it is possible to compensate for the imperfect characteristics of etalon filters. In fact, any type of reasonably Gaussian filter response can be reshaped using a wavelength locked loop to provide an arbitrary offset between the signal center wavelength and the filter peak center wavelength, compensating for factors such as the filter rolloff, signal spectral width, and changes in the transmission line properties due to temperature, microbending, aging and other effects. This approach allows the construction of very inexpensive guiding filters, which can be based on low precision frequency domain filters with active compensation; it also improves the accuracy of existing filters. This approach also provides a new degree of freedom in the guide filter design (the guide filter can be designed with a dynamically controllable offset and sliding range). Taken together, these advantages should make it possible to design new types of dispersion managed soliton networks.

The present invention provides guiding filters using wavelength locked feedback loops. Note that the soliton pulses are continuously modulated in frequency content by the interaction between GVD and SPM. A further reduction in timing jitter can be achieved if amplitude and/or phase modulation is applied to the signal periodically with distance at the bit rate.

Figure 1A:
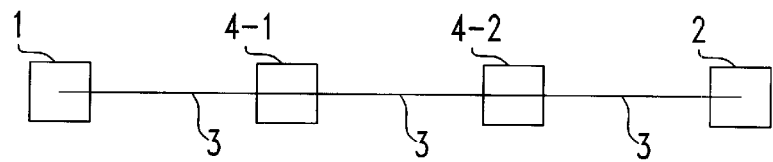
FIG. 1(a) illustrates an embodiment of the present invention in a fiber link communication system having a source, a receiver, and a plurality of periodically positioned sliding frequency guiding filters, each of which uses a wavelength locked loop positioned along the length of the fiber link communication system.
Figure 1B:
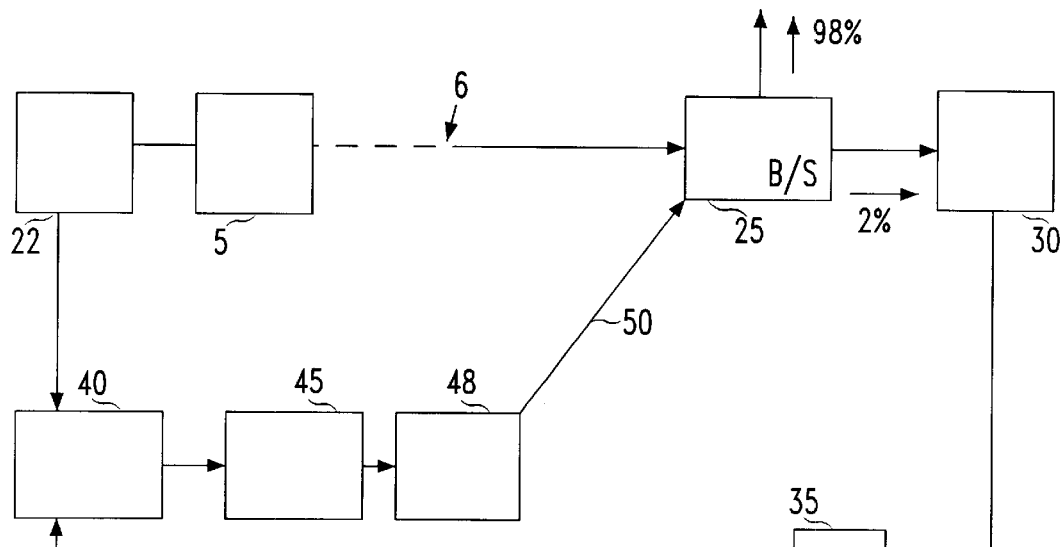
FIG. 1(b) illustrates a basic embodiment of a frequency guiding filter pursuant to the present invention for dispersion managed soliton transmission which employs a variable bandpass filter.

FIG. 1b illustrates a basic embodiment of a sliding frequency guiding filter pursuant to the present invention for a dispersion managed soliton transmission system which employs a variable bandpass filter 25. The variable bandpass filter 25 may be realized with a number of different technologies including an etalon with a variable spacing between the parallel mirrors; a tunable diffraction grating device; or a filter wheel can be rotated to insert different optical attenuations in the link. Note that this is preferentially a Gaussian or hyperbolic secant shaped filter with a smooth rolloff that encompasses most of the soliton frequency components.

A fiber link communication system 5 produces incident solitons 6 which are sampled, such as by using an optical beam splitter B/S which diverts a small amount (2% or so) of the solitons to a photodetector PIN diode 30. The detector 30 output is then amplified at 35 and mixed at 40 with the output of a local programmable sinusoidal oscillator 22 operating in the frequency range of a few kHz to a few MHz. The mixer 40 generates the cross product of the two signals, which is proportional to the offset between the frequency spectrum of the incident soliton 6 and the center wavelength of the bandpass filter 25. The sign of this cross product also determines in which direction the wavelength/frequency spectra of the filter 25 must be adjusted to better align with the soliton 12 peak wavelength.

Thus, it is a simple matter to vary the filter 25 bandpass in response to this signal and to adjust the filter to match with the soliton peak; spurious frequency components are filtered out at 45, and the filtered cross product signal is then integrated and preferably digitized at 48, and the resultant control signal is used to adjust variable bandpass filter 25 to improve soliton timing jitter.

One advantage of this approach over previous techniques is that the filter response is controlled by an adaptive feedback loop, which adjusts to respond to varying link conditions or environmental changes such as temperature, fiber imperfections, etc. This means that the filter response is adjusted to result in a minimal damping length for the filter and a corresponding minimal timing jitter. The adaptive nature of this solution means that it can be used with various grades of optical fiber, enabling soliton transmission over fibers which previously would not have been suitable for or able to support such communication system links.

Furthermore, the present invention is programmable; by changing the oscillator 22 frequency, the properties of the desired filter 25 can be adjusted to handle different shapes of solitons or solitons with varying frequency content (for example, those resulting from soliton collisions in the link). Guiding filters can reduce timing jitter resulting from soliton collisions provided that the collision length is at least a few times greater than the filter spacing. In this case, when large frequency excursions of solitons are involved, the curvature of a shallow etalon filter response reduces with the deviation of the frequency from the filter peak. Thus, ideal parabolic filters would be a better choice than etalon filters in this application. One advantage of the present invention is the ability to program the filter rolloff function to behave more like a parabolic filter, even if the filter element is a simple etalon or other device. The wavelength locked loop's frequency profile can also be adjusted to better handle large frequency excursions.

As noted earlier, guiding filters are often placed in the same locations as optical amplifiers. Every time a soliton passes through a guiding filter, it loses some energy; this is often compensated by increasing the gain of the optical amplifier. Under this condition, the amplifier spontaneous emission noise (ASE) and other nonsoliton frequency components in the neighborhood of the filter peak experience exponential growth with distance, which may cause bit errors and can lead to soliton instabilities. As a result, guiding filters must be carefully chosen to be weak enough so that the amplifier gain doesn't have to be increased by a large amount, yet strong enough to perform their spectral filtering operations. In practice, the filter strength must be chosen to minimize the total penalty from timing jitter and excess gain. One advantage of the subject invention is its ability to dynamically adjust the filter strength to compensate for variations in the optical power or spectral content of the link; the filters based on wavelength locked loops can therefore be placed anywhere along a fiber optic link and adjusted for optimal performance.

A related approach to overcoming the tradeoff between filter strength and excessive gain is presented by sliding frequency filters. In this case, a series of guiding filters is implemented in which the transmission peak of each filter is shifted in frequency with respect to the peak of the previous filter, so that the center frequency slides with distance at some predetermined rate. Thanks to their nonlinearity, solitons can follow the frequency sliding, but unwanted linear radiation such as ASE and nonsoliton components cannot slide and is therefore filtered out. This effectively converts the fiber into an all-optical passive regenerator, which is also compatible with DWDM. The fiber transmission line parameters (filter strength, excess gain, fiber dispersion, and mode area) determine the unique parameters of the stable soliton solutions which can propagate in this link; all other components are filtered out. This has the added feature of self-equalizing the energies of different channels in DWDM transmission links; even considerable variation in optical amplifier gain across different wavelengths will not affect the energies of the solitons channels compatible with such a tuned transmission line.

FIG. 1a illustrates an embodiment of the present invention in a fiber link communication system 2 having a source 4, a receiver 6, and a plurality of periodically positioned sliding frequency guiding filters 8-1, 8-2 . . . 8-n, each of which uses a wavelength locked loop, positioned along the length of the fiber link communication system. Each link segment between adjacent filters 8 may have a different dispersion, as in the case of a dispersion managed soliton network. Multiple filters 8-1, 8-2 . . . 8-n, each having a wavelength locked loop, are positioned periodically along the link as shown, using the same fundamental building blocks. The center frequency of each filter is tuned by a control circuit that can be programmed to generate any desired amount of filter sliding and slide rates.

Figure 1C:
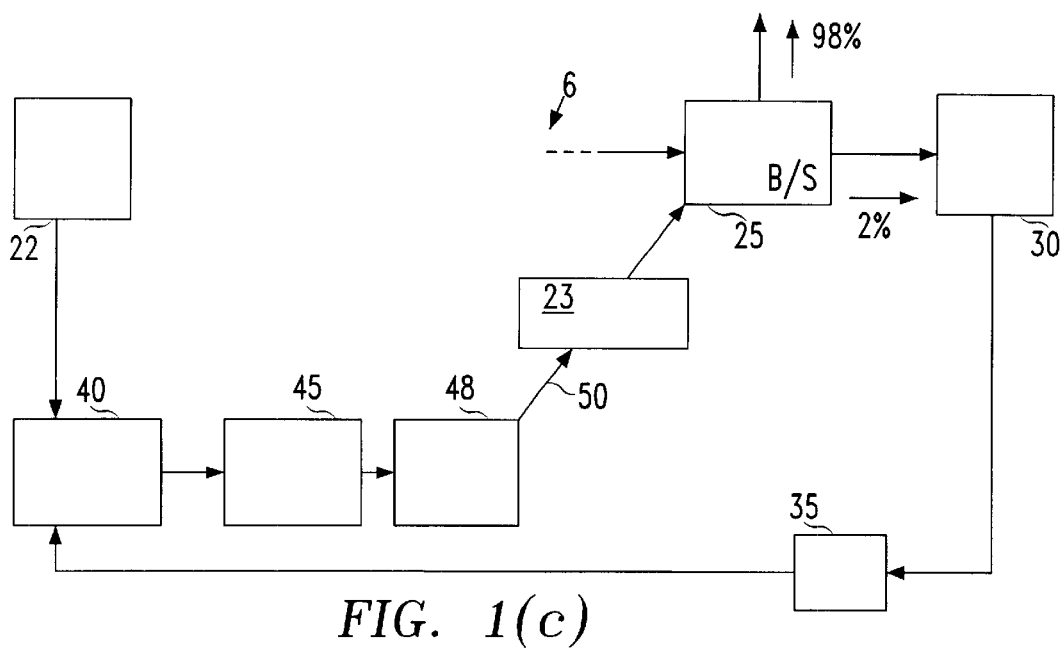
FIG. 1(c) illustrates details of an alternative embodiment pursuant to the present invention wherein each filter in the link is electronically programmed with a desired amount of frequency sliding, to precisely control the sliding of one filter with respect to another filter.

FIG. 1c illustrates further details of this embodiment wherein each filter in the link is electronically programmed at 23 with the desired amount of frequency sliding, to precisely control the sliding of one filter 4 with respect to another filter 4. This embodiment also applies to dispersion modulated soliton networks, in which the soliton spectral bandwidth oscillates with distance. Thus, if different link segments are made up of different fiber/dispersion properties, the appropriate type of sliding frequency guiding filter can compensate for the different properties based on the wavelength locked loop design.

Referring to FIG. 1b, the wavelength locked feedback loop includes a photodiode 30, whose output current is proportional to the dither modulation of the light intensity which is produced after the optical pulse has passed through the variable bandpass filter(s) 25. The photodiode output is amplified by an amplifier 35 and is then mixed with the original dither signal in a multiplier 40 to produce a vector cross product. The output of the multiplier is then filtered at 45 to pass the vector cross product, which is then integrated, and preferably digitized, at 48 to produce a feedback signal that indicates to the variable bandpass filter control 25 whether the variable bandpass filter center wavelength is aligned with the optical pulse center wavelength, and if not in what direction and by what amount the wavelength must be shifted or changed to be brought into alignment with the center wavelength of the soliton optical pulse.

Technically, the multiplication with the original dither signal is used to detect the relative phase of the signal, which is determined by the local slope of the wavelength passband; feedback through an integrator can then follow the slope to the peak of the passband. This feedback signal is an important element of the present invention as it enables a digital logic control circuit to adjust the variable bandpass filter by the correct amount and in the proper direction to shift or change the variable bandpass filter center wavelength, bringing it into closer alignment with the center wavelength of the soliton optical pulse. Since this is an active feedback process, it can be used to correct for changes in the laser or filter properties such as those caused by ageing or temperature changes.

The feedback loop is stable for a wide range of conditions, and may be implemented as a variant on an externally excited adaptive loop design familiar from control systems theory. Note that the feedback loop acts as a high level state machine, compensating for all of the internal variables (wavelength selectivity) of the laser diode, filter, and the transmission system with a single mechanism that stabilizes and locks the wavelength to any desired value.

Further, the variable bandpass filter can easily be tuned in wavelength to another desired wavelength by this feature.

The wavelength-locked loop (WLL) is now described in further detail with reference to FIGS. 1(d) and 2–9. The basic operating principle of the wavelength-locked loop (WL) is described in greater detail in commonly-owned, co-pending U.S. patent application Ser. No. 09/865,256, entitled APPARATUS AND METHOD FOR WAVELENGTH-LOCKED LOOPS FOR SYSTEMS AND APPLICATIONS EMPLOYING ELECTROMAGNETIC SIGNALS, the whole contents and disclosure of which is incorporated by reference as if fully set forth herein.

Figure 1D:
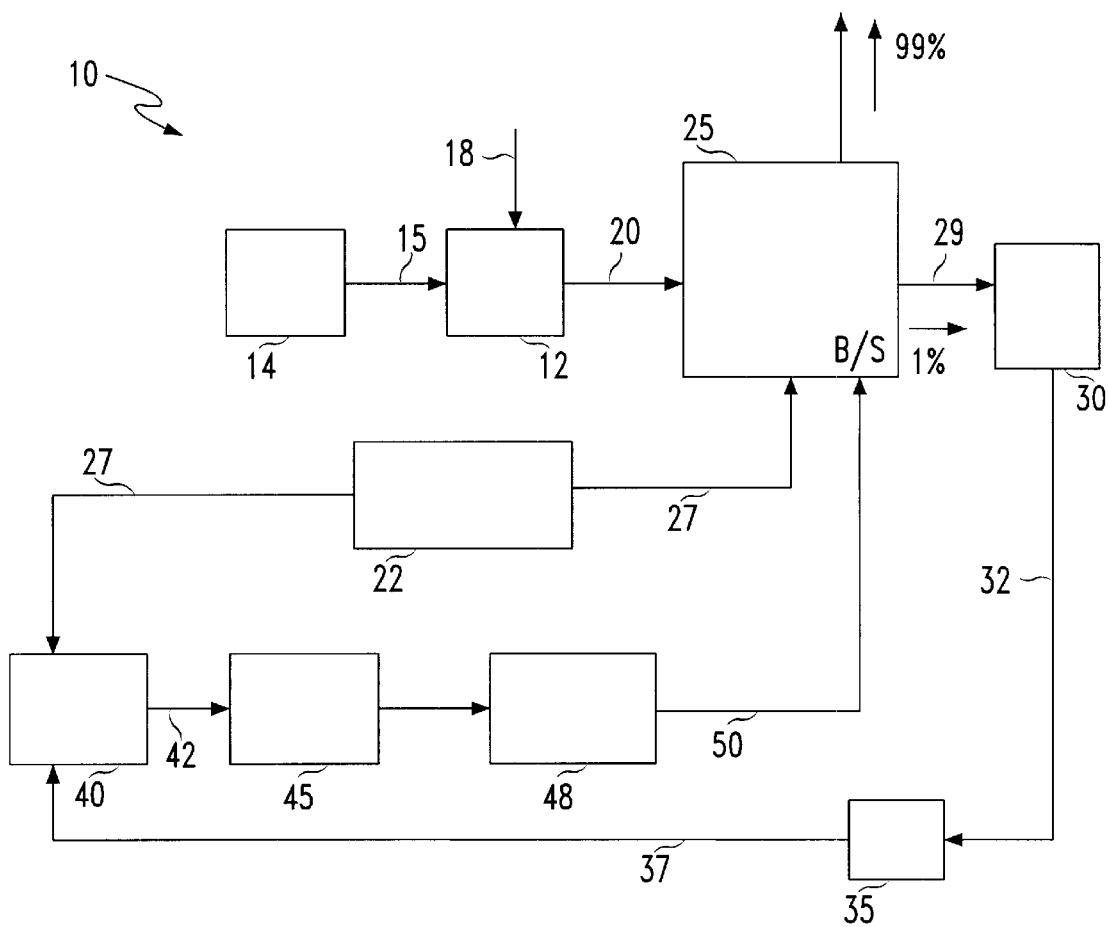
FIG. 1(d) illustrates a general block diagram depicting the underlying system architecture for tuning tunable frequency selective devices such as a bandpass filter according to the principles of the present invention by using a dither wavelength locked feedback loop.

FIG. 1(d) depicts an exemplary optical system 10 including a light source such as laser diode 12 driven with both a bias voltage 15 from a voltage bias circuit 14 and modulated data 18 from a data source (not shown). The laser diode generates an optical (laser light) signal 20 that is received by a tunable bandpass filter 25, or any tunable frequency selective device including but not limited to: thin film optical interference filters, acousto-optic filters, electro-optic filters, diffraction gratings, prisms, fiber Bragg gratings, integrated optics interferometers, electroabsorption filters, and liquid crystals. The laser diode itself may comprise a standard Fabry Perot or any other type (e.g., Vertical Cavity Surface Emitting (VCSEL)), light emitting diodes, or, may comprise a Distributed Feedback semiconductor laser diode (DFB) such as commonly used for wavelength multiplexing. Preferably, the laser diode emits light in the range of 850 nm to 1550 nm wavelength range. As mentioned, the bandpass filter may comprise a thin film interference filter comprising multiple layers of alternating refractive indices on a transparent substrate, e.g., glass.

As further shown in FIG. 1(d), according to the invention, there is an added sinusoidal dither modulation circuit or oscillator 22 for generating a sinusoidal dither modulation that modulates the variable bandpass filter wavelength control. The sinusoidal dither signal varies the variable bandpass filter to vary the wavelength. The dither modulation frequency is on the order of a few kilohertz (kHz) but may range to the Megahertz range. Preferably, the dither modulation frequency is much less than the data rate which is typically on the order of 1–10 GHz. Modulation of the variable bandpass filter wavelength control in this manner causes a corresponding dither in the filter passed center wavelength and the passed soliton optical pulse. Modulated data is then imposed on the laser, and the optical output passes through the bandpass filter 25. Preferably, the filter 25 is designed (e.g. with a beam splitter B/S) to tap off a small amount of light, for example, which is incident upon a photo detector receiver device, e.g., PIN diode 30, and converted into an electrical feedback signal 32. The amount of light that may be tapped off may range anywhere between one percent (1%) to five percent (5%) of the optical output signal, for example, however, skilled artisans will appreciate any amount of laser light above the noise level that retains the integrity of the output signal including the dither modulation characteristic, may be tapped off. The remaining laser light passes on through the filter 25 to the optical network (not shown). As the PIN diode output 32 is a relatively weak electric signal, the resultant feedback signal is amplified by amplifier device 35 to boost the signal strength. The amplified electric feedback signal 37 is input to a multiplier device 40 where it is combined with the original dither modulation signal 27. The cross product signal 42 that results from the multiplication of the amplified PIN diode output (feedback signal) 37 and the dither signal 27 includes terms at the sum and difference of the dither frequencies. The result is thus input to a low pass filter device 45 where it is low pass filtered and then averaged by integrator circuit 48 to produce an error signal 50 which is positive or negative depending on whether the laser center wavelength is respectively less than or greater than the center point of the bandpass filter. The error signal 50 is input to the variable bandpass filter wavelength control. In this manner, the center wavelength of the variable bandpass filter will increase or decrease until it exactly matches the center wavelength of the optical pulse. Alternately, the error signal 50 may be first converted to a digital form prior to being input to the variable bandpass filter wavelength control.

According to one aspect of the invention, the WLL will automatically maintain tracking of the variable bandpass filter center wavelength to the center wavelength of the soliton optical pulse. However, in some cases, it may not be desirable to enable alignment of the variable bandpass filter to the soliton optical pulse peak, e.g., in an optical attenuator. Thus, as shown in the embodiment depicted in FIG. 8, there is provided an optional external tuning circuit, herein referred to as a wavelength shifter device 51, that receives the error signal and varies or offsets it so that the laser center wavelength may be shifted or offset in a predetermined manner according to a particular network application. That is, the wavelength shifter 51 allows some external input, e.g., a manual control element such as a knob, to introduce an arbitrary, fixed offset between the variable bandpass filter center wavelength and the optical pulse center wavelength.

Figure 7:
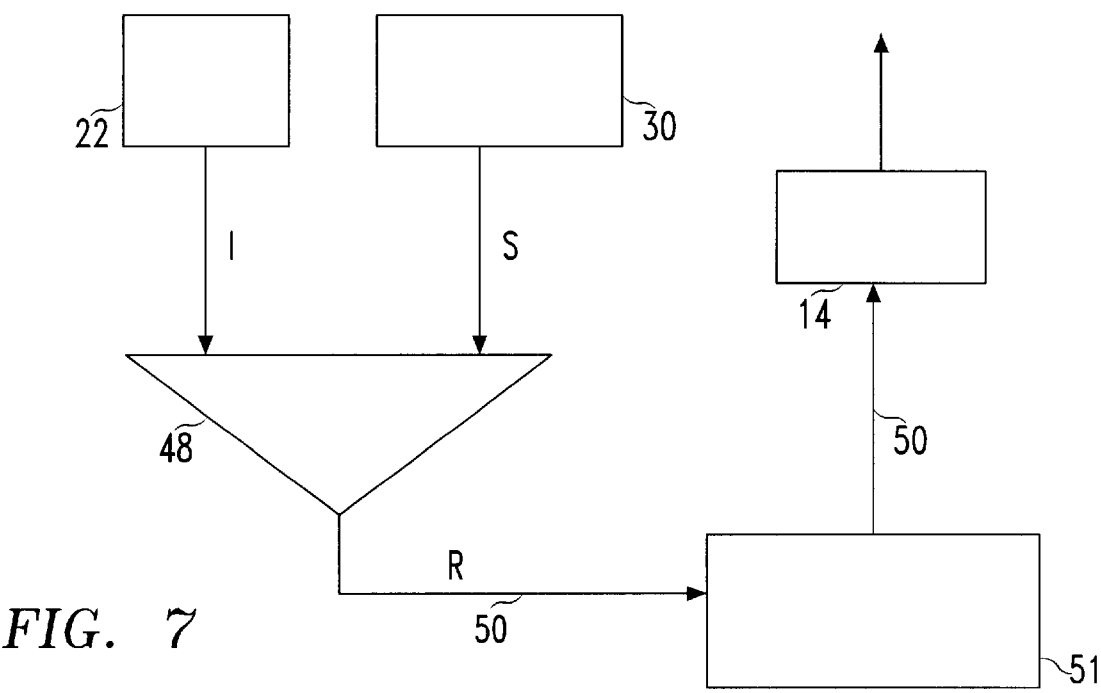
FIG. 7 is a generalized circuit diagram depicting how dithering is implemented in the WLL system of the present invention.

A generalized description of how dithering is implemented for providing a WLL in the present invention is now provided in view of FIG. 7. As shown in FIG. 7, the sinusoidal dither generator (harmonic oscillator) 22 produces a dither signal 27 which causes the variable bandpass filter center wavelength to oscillate with a small amplitude about its nominal position. After passing thru the optical bandpass filter, the optical pulse has an intensity variation which is detected by the photodetector circuit 30 (e.g., photodiode). The servo loop feeds back the photodiode output signal, S, and takes a vector cross product with the original sinusoidal dither, I. The cross product result is averaged (integrated) over a time period T at 48 and may be sampled and digitized to produce the equivalent of an error detect signal, R, which is bipolar and proportional to the amount by which the variable bandpass filter center wavelength and the optical pulse center wavelength are misaligned. Optionally, the signals may be normalized to account for variations in the laser power output from the filter. Optionally, an external tuning circuit 51 may be implemented to receive the error signal and enable the variable bandpass filter center wavelength offset to vary to an arbitrary value. Finally, the error signal R is fed back to be used by the wavelength control 14 to adjust the variable bandpass filter center wavelength in the proper direction to better align with the optical pulse center wavelength.

Figure 2:
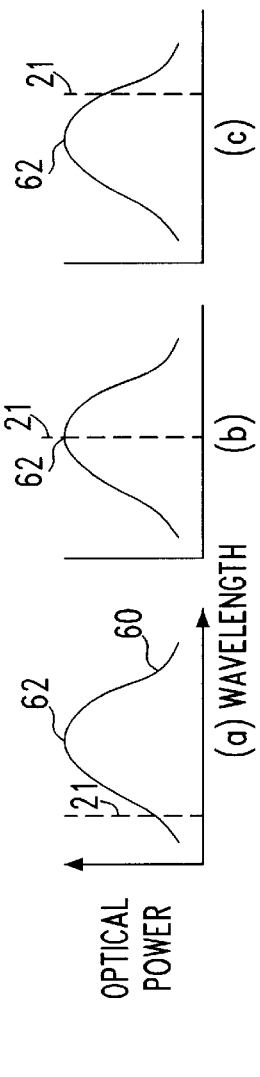
FIGS. 2(a)–2(c) are signal waveform diagrams depicting the relationship between laser optical power as a function of wavelength for three instances of optic laser signals.
Figure 3:
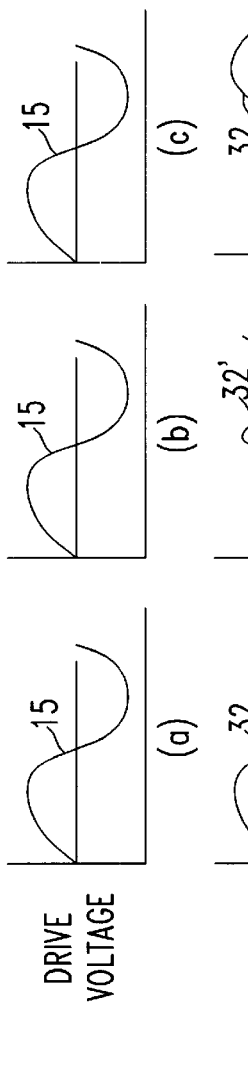
FIGS. 3(a)–3(c) are signal waveform diagrams depicting the laser diode drive voltage dither modulation (a sinusoid) for each of the three waveform diagrams of FIGS. 2(a)–2(c)

The operating principle is further illustrated in the timing and signal diagrams of FIGS. 2–6. FIGS. 2(*a*)–2(*c*) particularly depict the relationship between laser optical power as a function of wavelength for three instances of optic laser signals: a first instance (FIG. 2(*a*)) where the optical pulse frequency center point 21 is less than the bandpass function centerpoint as indicated by the filter bandpass function 60 having centerpoint 62 as shown superimposed in the figures; a second instance (FIG. 2(*b*)) where the optical pulse frequency center point 21 is aligned with the bandpass function centerpoint 62; and, a third instance (FIG. 2(*c*)) where the optical pulse frequency center point 21 is greater than the bandpass function centerpoint 62. In each instance, as depicted in corresponding FIGS. 3(*a*)–3(*c*), the variable bandpass filter drive voltage signal 15 is shown dithered (a sinusoid) resulting in the optical pulse wavelength dithering in the same manner. The optical pulse is dithered as it passes through the filter, and is converted to electrical form by the PIN diode 30. In each instance of the optical pulse signals depicted in FIGS. 2(*a*) and 2(*c*) having frequency centerpoints respectively less than and greater than the band pass filter centerpoint, it is the case that the dither harmonic spectra does not pass through the frequency peak or centerpoint of the bandpass filter. Consequently, the resulting output of the PIN diode is an electric sinusoidal signal of the same frequency as the dither frequency such as depicted in corresponding FIGS. 4(*a*) and 4(*c*). It is noted that for the optical pulse signals at frequencies below the peak (FIG. 2(*a*)) the feedback error signal 32 corresponds in frequency and phase to the dither signal (FIG. 4(*a*)), however for the optical pulse signals at frequencies above the peak (FIG. 2(*c*)) the feedback error signal 32 corresponds in frequency but is 180° opposite phase of the dither signal (FIG. 4(*c*)). Due to the bipolar nature of the feedback signal (error signal) for cases when the optical pulse signal centerpoint is misaligned with the bandpass filter centerpoint, it is thus known in what direction to drive the variable bandpass filter (magnitude and direction), which phenomena may be exploited in many different applications. For the optical pulse signal depicted in FIG. 2(*b*) having the optical pulse frequency center point aligned with the bandpass function centerpoint, the dither harmonic spectra is aligned with and passes through the frequency peak (maximum) of the bandpass filter twice. That is, during one cycle (a complete round trip of the sinusoid dither signal), the dither signal passes though the centerpoint twice. This results in a frequency doubling of the dither frequency of the feedback signal 32, i.e., a unique frequency doubling signature, as depicted as PIN diode output 32' in FIG. 4(*b*) showing a feedback error signal at twice the frequency of the dither frequency.

Figure 4:
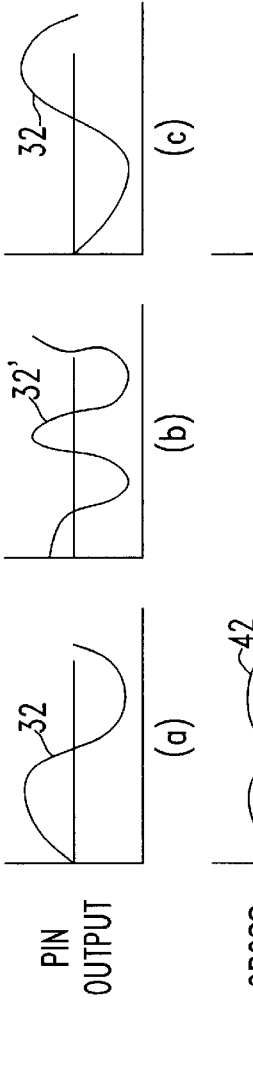
FIGS. 4(a)–4(c) are signal waveform diagrams depicting the resulting feedback error signal output of the PIN diode for each of the three waveform diagrams of FIGS. 2(a)–2(c)
Figure 5:
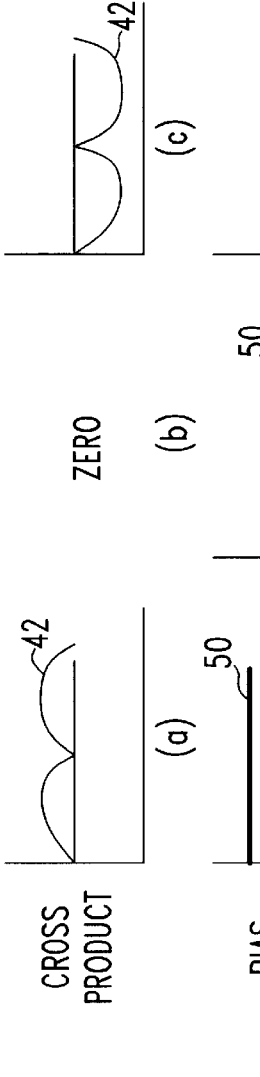
FIGS. 5(a)–5(c) are signal waveform diagrams depicting the cross product signal resulting from the mixing of the amplified feedback error with the original dither sinusoid.
Figure 6:
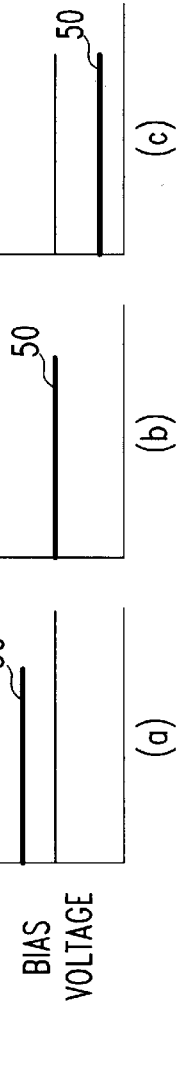
FIGS. 6(a)–6(c) are signal waveform diagrams depicting the rectified output laser bias voltage signals which are fed back to adjust the laser current and center frequency.

Thus, in each instance, as depicted in corresponding FIG. 4(*b*), the resulting feedback signal exhibits frequency doubling if the optical pulse center wavelength is aligned with the filter center wavelength; otherwise it generates a signal with the same dither frequency, which is either in phase (FIG. 4(*a*)) or out of phase (FIG. 4(*c*)) with the original dither modulation. It should be understood that, for the case where the optical pulse center frequency is misaligned with the bandpass filter peak and yet there is exhibited partial overlap of the dither spectra through the bandpass filter peak (i.e., the centerpoint peak is traversed twice in a dither cycle), the PIN diode will detect partial frequency doubling at opposite phases depending upon whether the optical pulse center frequency is inboard or outboard of the filter center frequency. Thus, even though partial frequency doubling is detected, it may still be detected from the feedback signal in which direction and magnitude the laser signal should be driven for alignment.

Thus, referring now to FIGS. 5(a) and 5(c), for the case when the optical pulse and filter are not aligned, the cross product signal 42 resulting from the mixing of the amplified feedback error with the original dither sinusoid is a signed error signal either at a first polarity (for the optical pulse signals at frequencies below the bandpass filter centerpoint), such as shown in FIG. 5(a), or at a second polarity (for the optical pulse signals at frequencies above the bandpass filter centerpoint), such as shown in FIG. 5(c). Each of these signals may be rectified and converted into a digital output variable bandpass filter bias voltage signal 50 as shown in respective FIGS. 6(a) and 6(c), which are fed back to respectively increase or decrease the variable bandpass filter center wavelength in such a way that the variable bandpass filter center wavelength moves closer to the optical pulse center wavelength. For the case when the variable bandpass filter and the optical pulse are aligned, the cross product generated is the frequency doubled signal (twice the frequency of the dither) as shown in the figures. Consequently, this results in a 0 V dc bias voltage (FIG. 6(b)) which will maintain the laser frequency centerpoint at its current wavelength value.

In order to describe further benefits of the invention, it is first noted that although it may appear that if a filter bandpass is larger than the laser linewidth, then the entire optical pulse will pass through the filter unaffected. However, this is clearly not the case; the laser spectra and filter function are both Gaussian, in both time and wavelength (reciprocal of frequency). Thus, passing the laser spectra through the filter results in a convolution between the spectrum and filter functions. Implementing analog signal processing, an output optical spectrum is produced which is actually narrower than the input spectra (i.e., some of the light is lost during filtering). In a real WDM system there may be at least two (2) bandpass filter devices in a link to perform multiplex/demux functions at either end: in practice, there may be many bandpass filters configured in series. This leads to a secondary problem: when two filters are in series and their bandpass centers are not aligned, the original optical pulse signal must be convolved with both filter functions; this narrows the signal spectra even further, at the cost of lowering the optical power by discarding the edges of the light spectra. A succession of filters not aligned with each other can be shown to have the same characteristics as a single, much narrower, filter. This further reduces the margin for misalignment between the optical pulse and multiple filters. For example, even if the ideal center to center, wavelength spacing of a WDM system is 0.8 nm, due to misalignment between the mux and demux filters this window may be reduced to approximately 0.4 nm or less. This would require extreme precision and stability for the laser generating the optical pulse, making for a very expensive laser transmitter. Thus, there are really two problems to be solved: (1) laser to filter alignment; and, (2) filter to filter alignment. Note that when signals propagate through a fiber optic network and traverse multiple filters the wavelength may shift due to these effects combined with temperature and environmental effects. It is a real, practical problem to keep an input wavelength the same throughout the network, so that network architectures such as ring mesh, wavelength reuse, and wavelength conversion may work properly, i.e., this is called frequency referencing.

The present invention addresses frequency referencing as it can handle both of these instances. For example, as shown in FIG. 8, there is depicted a general block diagram depicting the underlying system architecture employing the wavelength-locked loop technique in an optical system 10' employing a series connection of two bandpass filters 25a, 25b, the latter of which is a variable bandpass filter.

Figure 9:
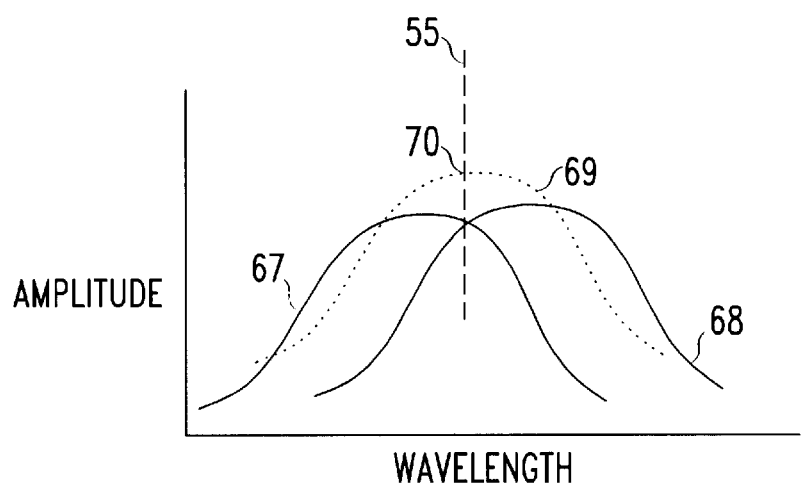
FIG. 9 is a signal waveform diagram depicting the relationship between laser optical power as a function of wavelength for the case of aligning a laser signal through a system including two bandpass filters in series, as depicted in FIG. 8.
Figure 8:
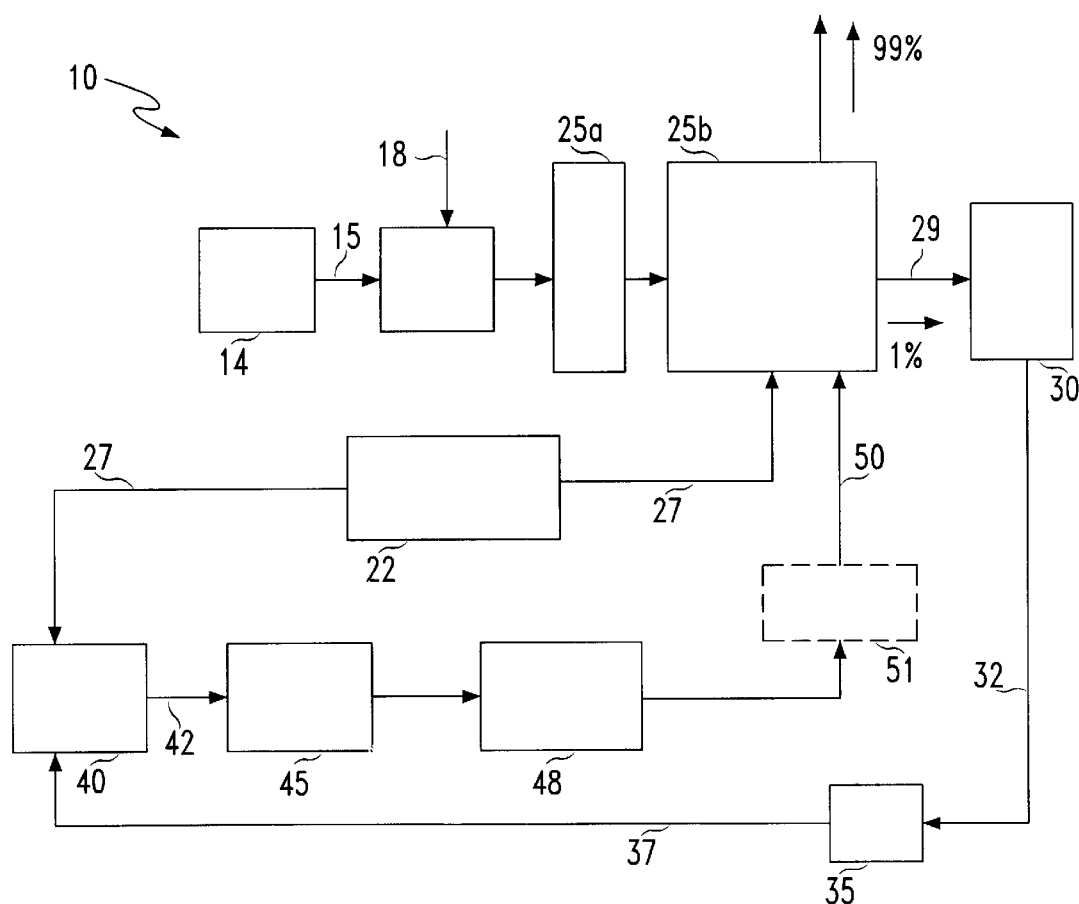
FIG. 8 is a general block diagram depicting the underlying system architecture for employing an optional wavelength shifter in the wavelength-locked loop technique, and also an optical system employing two bandpass filters according to the present invention.

FIG. 9 depicts each of the individual filter responses 67 and 68 for the two bandpass filters 25a, 25b of FIG. 8 and the corresponding composite filter response 69 having a centerpoint or peak 70. When performing filter to filter or multiple filter alignment, the technique of the invention depicted in FIG. 8 may be implemented to tune the combined bandpass filters to have a center frequency such that maximum power transfer will occur through the series connection of the two bandpass filters as represented by its composite filter response 69 (FIG. 9). Generally, a cascade of bandpass filters results in an effective narrowing of the overall passband, as the net filter response is a convolution of the component filter responses. The WLL can align the laser center wavelength with the middle of this composite passband.

The system and method of the present invention may be used to tune the wavelength of the variable bandpass filter to compensate for other elements in a network. The variable bandpass filter can comprise wavelength selective switches, tunable filters, in fiber Bragg gratings, ring resonators in optical amplifiers, external modulators such as acousto-optic tunable filters, or array waveguide gratings. This applies to many other optical components in the network as well (for example, optical amplifiers that can act as filters when operating in the nonlinear regime). This method may additionally be used to implement less expensive devices for all of the above application areas. As the optical loss of a WDM filter/laser combination is greatly reduced by implementing the technique of the invention, significantly larger link budgets and longer distances may be supported. Further, the invention permits much lower cost lasers and filters to be used; since these are the most expensive parts of a WDM device today, there is a significant cost reduction in the WDM equipment.

While several embodiments and variations of the present invention for a frequency guiding filter for dispersion managed soliton transmission are described in detail herein, it should be apparent that the disclosure and teachings of the present invention will suggest many alternative designs to those skilled in the art.

Having thus described our invention, what we claim as new and desire to secure by Letters Patent is:

1. A frequency guide filter for controllably shifting a center wavelength passed by the frequency guide filter relative to a center wavelength of a transmitted optical pulse comprising:

a variable wavelength, frequency selective element for passing an optical pulse signal and defining a center wavelength, the location of which is controllably shiftable;

a wavelength locked feedback loop for controlling the location of the center wavelength of the frequency selective element with respect to the center wavelength of the transmitted optical pulse.

2. The frequency guide filter of claim 1, wherein the transmitted optical pulse is a soliton wherein the group velocity dispersion (GVD) of the transmitted optical pulse and the self-phase modulation (SPM) of the transmitted optical pulse are applied to the transmitted optical pulse with opposite signs such that they cancel each other out to produce an optical pulse which does not change shape as it propagates.

3. The frequency guide filter of claim 1, wherein the variable wavelength, frequency selective element is programmable.

4. The frequency guide filter of claim 3, wherein the variable wavelength, frequency selective element is programmable to change the frequency of an oscillator in the frequency guide filter, to adjust the bandpass properties of the frequency guide filter.

5. The frequency guide filter of claim 1, in an optical transmission system having an optical source, an optical receiver, and a plurality of said frequency guide filters positioned periodically along the length of the optical transmission system between the optical source and the optical receiver to define a plurality of optical transmission system segments, wherein each wavelength locked feedback loop in each frequency guide filter provides precise control over the center wavelength of the frequency guide filter with respect to the center wavelength of optical pulse.

6. The frequency guide filter of claim 5, wherein the optical transmission system is a sliding frequency optical transmission system in which the center wavelength of each frequency guide filter is shifted in frequency with respect to the center wavelength of the previous frequency guide filter, so that the center wavelength of the transmitted optical pulse slides with distance at a predetermined rate.

7. The frequency guide filter of claim 6, wherein the center wavelength of each frequency guide filter is tuned by a control circuit which is programmed to generate a given amount of filter sliding and slide rate.

8. The frequency guide filter of claim 5, wherein each transmission system segment defined between adjacent frequency guide filters has a different dispersion, in a dispersion managed soliton network.

9. The frequency guide filter of claim 5, in a dispersion modulated soliton network in which the soliton spectral bandwidth oscillates with distance.

10. The frequency guide filter of claim 1, wherein the frequency guide filter comprises an etalon filter with a variable spacing between substantially parallel mirrors, and the wavelength locked loop compensates for filter characteristics of the etalon filter to produce a desired filter rolloff function.

11. The frequency guide filter of claim 10, wherein the etalon filter comprises a Fabry-Perot etalon filter having multiple peaks, wherein each peak is allocated for use with a different channel in a wavelength division multiplex (WDM) system.

12. The frequency guide filter of claim 1, wherein the variable wavelength, frequency selective element is a bandpass filter which defines a bandpass center wavelength.

13. The frequency guide filter of claim 1, wherein the variable wavelength, frequency selective element comprises a tunable diffraction grating.

14. The frequency guide filter of claim 1, wherein the variable wavelength, frequency selective element comprises a filter wheel which is rotated to provide different optical frequency attenuations.

15. The frequency guide filter of claim 1, wherein the wavelength locked loop provides an offset between the center wavelength of the frequency selective element and the center wavelength of the optical pulse.

16. The frequency guide filter of claim 1, including:
    a dither generator for generating a periodic dither signal at a dither frequency which is applied to the variable wavelength, frequency selective element, which produces a periodic change in the center wavelength passed by the variable wavelength, frequency selective device;
    a detector detects the optical pulse which passes through the variable wavelength, frequency selective device;
    a mixer mixes the detector output with the dither signal to produce an output cross product feedback signal which indicates whether the center wavelength of the variable wavelength, frequency selective element is aligned with the center wavelength of the optical pulse, and if not in what direction and by what amount the wavelength of the variable wavelength, frequency selective element must be shifted to be brought into alignment with the center wavelength of the optical pulse.

17. The frequency guide filter of claim 16, wherein the dither generator generates a sinusoidal dither signal at a frequency of several kHz or less.

18. The frequency guide filter of claim 1, in a wavelength division multiplexing communication system having a plurality of different channels carrying a plurality of different wavelength signals, wherein each channel includes a laser, a variable wavelength, frequency selective element, and a dither-operated wavelength locked feedback loop.

19. The frequency guide filter of claim 1, including a dither generator for generating a periodic dither signal at a dither frequency which is applied to the variable wavelength, frequency selective element, which produces a periodic change in the center wavelength passed by the variable wavelength, frequency selective element.

20. The frequency guide filter of claim 16, further including:
    a low-pass filter for filtering said cross-product signal; and
    an integrator circuit for averaging said output cross-product signal to generate an error signal, wherein said error signal is positive or negative depending on whether the center wavelength of the frequency-selective element is less than or greater than the center wavelength of said wavelength selective device.

21. The frequency guide filter of claim 12, further including a wavelength shifter for receiving said error signal and varying said error signal in an amount to offset the center wavelength of the variable wavelength, frequency selective element from the center wavelength of the transmitted optical pulse.

* * * * *